June 23, 1936.  R. R. DONALDSON, JR  2,044,936
RECEIVING REGULATOR AND CONTROL APPARATUS THEREFOR
Filed Sept. 16, 1933 . 2 Sheets-Sheet 1
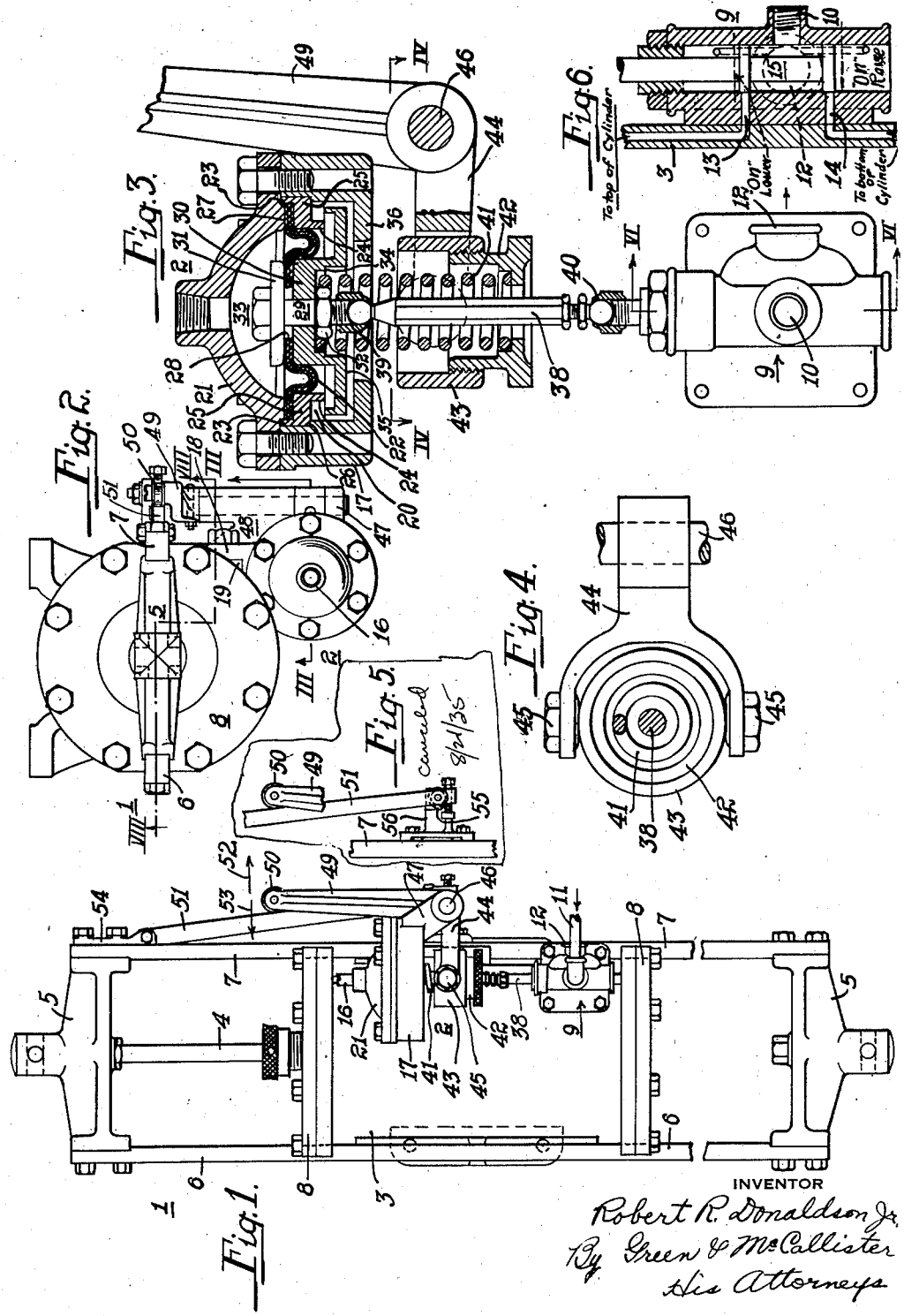
INVENTOR
Robert R. Donaldson Jr.
By Green & McCallister
His Attorneys June 23, 1936.  R. R. DONALDSON, JR  2,044,936
RECEIVING REGULATOR AND CONTROL APPARATUS THEREFOR
Filed Sept. 16, 1933   2 Sheets-Sheet 2
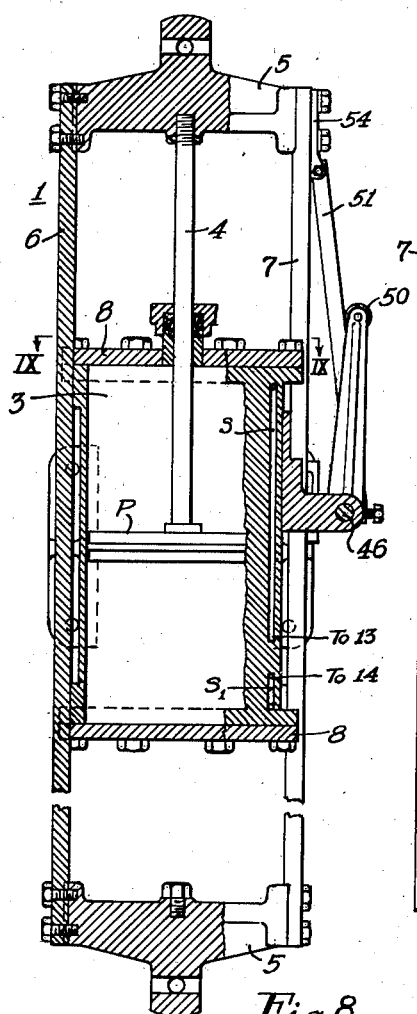
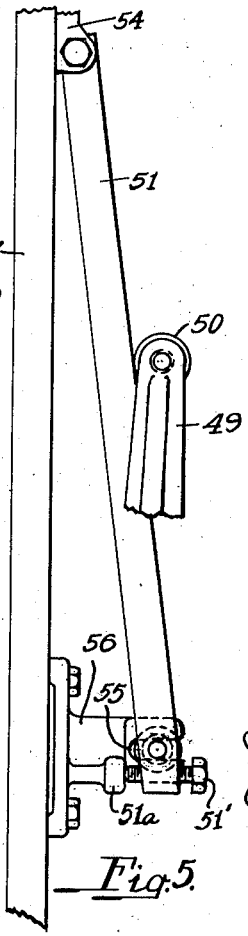
Fig. 5.
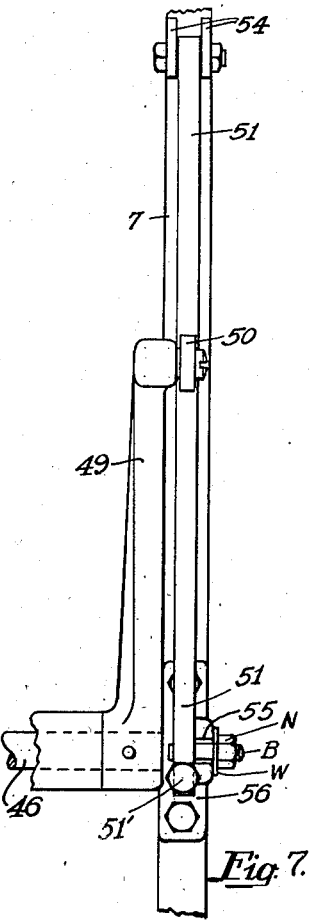
Fig. 7.
Fig. 8.
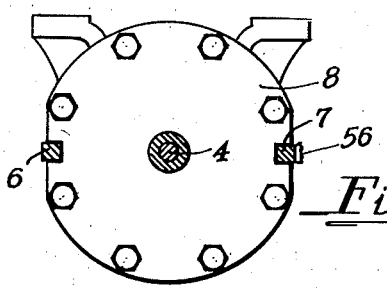
Fig. 9.
INVENTOR.
Robert R. Donaldson, Jr.
BY Green & McCallister
His ATTORNEYS.

Patented June 23, 1936

2,044,936

UNITED STATES PATENT OFFICE 2,044,936

RECEIVING REGULATOR AND CONTROL APPARATUS THEREFOR

Robert R. Donaldson, Jr., Pittsburgh, Pa., assignor to John M. Hopwood, Dormont, Pa.

Application September 16, 1933, Serial No. 689,745

4 Claims. (Cl. 121—41)

This invention relates to receiving regulators of the reciprocating piston type and more particularly to pressure-sensitive apparatus for governing the movement of the piston of said regulator.

An object of this invention is the provision of pressure-sensitive apparatus that shall be effective to prevent over travel or hunting of regulators of the character referred to above, and thereby attain stable operation of such regulators under all conditions.

Another object of the invention is the provision of pressure-sensitive apparatus, for governing the operation of regulators, that shall be free of lost motion between its component moving parts and in the operative connections between the regulator and said pressure-sensitive apparatus, to the end that quick response, accurate and stable operation of the regulator may be obtained.

A further object of the invention is the provision of pressure-sensitive apparatus of the character referred to above that shall be of simple construction, accurate and reliable in operation, and easy to manufacture, install and maintain in service.

Other objects of the invention will, in part, be apparent and will, in part, be obvious from the following description taken in conjunction with the accompanying drawings, in which:—

Figs. 1 and 2 are front elevational and top plan views, respectively, of a receiving regulator provided with a pressure-sensitive device or apparatus embodying one form of the invention;

Fig. 3 is a view of the pressure-sensitive apparatus and the pilot valve shown in operative relation, the pressure-sensitive apparatus being in section taken on line III—III of Fig. 2.

Fig. 4 is a view in section taken on line IV—IV of Fig. 3; and

Fig. 5 is an enlarged fragmentary view of one of the side bars of the regulator on which an angling bar and a rocker arm are mounted, together with an adjustment for varying the angle between the side bar and angling bar; and Fig. 6 is a fragmentary section on line VI—VI, Fig. 3.

Fig. 7 is a fragmentary view in side elevation of the side and angling bars, the rocker arm, and the adjustment shown in Fig. 5;

Fig. 8 is a view in section of the regulator taken on line VIII—VIII of Fig. 1; and Fig. 9 is a view in section taken on line IX—IX of Fig. 8.

Throughout the drawings and specification, like reference characters indicate like parts.

In Fig. 1 of the drawings, a regulator 1, of the reciprocating piston type is shown in connection with a pressure-sensitive device or apparatus 2 adapted to control the direction and extent of movement of the piston in accordance with changes in a variable to be regulated.

Regulator 1 may be utilized to operate dampers, valves, stoker motors, and various other devices. In fact such devices are utilized to control the flow of gas in a conduit, the draft of a furnace, the quantity of steam delivered to a stoker engine, in accordance with variations in the medium controlled or in accordance with variations in some other medium which may be effected either directly or indirectly thereby.

In practice, receiving regulators are operated by and in accordance with the magnitude of pressure impulses delivered to the pressure-sensitive device of the regulator (in this case device 2) by a master regulator, not shown. The master regulator responds to variations in a particular operative, as steam pressure, gas flow, draft, etc., and transmits pressure impulses to the pressure sensitive device 2 whereby the regulator is caused to function and make such adjustment in the setting of a valve, damper, or whatever the device may be, as will maintain the particular operative substantially constant or will cause it to behave in some particular desired manner.

The regulator illustrated comprises a cylinder 3, in which a double-acting piston P is disposed and provided with a piston rod 4. The outer end of the piston rod is attached to a cross head 5 to the opposite ends of which side bars 6 and 7 are secured. These side bars are located on diametrically opposite sides of the cylinder, extend parallel to the longitudinal axis thereof, and are guided in notches formed in the cylinder heads 8. The lower ends of the side bars are also connected by a cross head 5. Thus the side bars and the cross-heads form, in effect, a frame which is carried by the piston rod, and either cross-head may be connected by suitable linkage to a damper, valve or whatever device is to be adjusted by and in accordance with movements of the piston.

The medium utilized to operate the piston in the cylinder 3 may be compressed air, or a suitable liquid under pressure, and for present purposes the medium may be taken to be compressed air.

To move the piston upwardly, the compressed air is communicated to the cylinder at the lower side of the piston; and to move the piston downwardly the air is admitted to the upper end of the cylinder so that it acts on the upper side of the piston. When air is admitted so as to act on one side of the piston air is exhausted from the space in the cylinder on the opposite side of the piston.

In order to admit compressed air to one side or the other of the piston and to exhaust air from the opposite side thereof, a pilot valve 9 is provided. This valve has an inlet port 10 to which a pipe 11 having compressed air therein, is connected. The valve also has an exhaust port 12 and outlet ports 13 and 14. Port 13 communicates with the upper end of the cylinder and port 14 with the lower end of the cylinder. These ports of the valve are covered or uncovered by means of a valve plug 15 having three operative positions; "on" for admitting air to the lower end of the cylinder from the inlet port 10; "on" for admitting air from the inlet port to the upper end of the cylinder; and "off". When the valve plug 15 is in the "off" position, inlet port 10 and the outlet ports 13 and 14 are closed; in the "on" position raise, outlet port 14 communicates with inlet port 10 and outlet port 13 connects the upper end of the cylinder with the exhaust port 12; and when in "on" position lower, outlet port 13 places the upper end of the cylinder in communication with inlet port 10 via passage S and outlet port 14 places the lower end of the cylinder in communication with the exhaust port via passage S1. Thus the piston is caused to move either up or down depending on which "on" position valve plug 15 is in, or the piston is stationary if the valve plug is in the "off" position. The valve plug is operated to one or the other of its "on" positions by device 2 in response to changes of pressure communicated thereto by a pressure impulse line 16 and is returned to "off" position (thereby stopping the piston) by mechanism (to be described later) that is operated by and in accordance with movements of the piston.

Further movement of the piston requires that the valve plug be shifted to one or the other of its "on" positions, but the piston is stopped again by the return of the valve plug to "off" position when the piston has moved a predetermined distance. Thus step-by-step movement of the piston is attained.

Device 2 is so arranged that a definite change in pressure is required for each successive operation of valve plug 15 to one or the other of its "on" positions. Therefore, if it be assumed that increasing pressure impulses cause the valve plug to move to "on" position raise, then an increase in pressure will result in valve plug 15 being shifted to this position, but when the piston has moved a predetermined distance the valve plug is returned to "off" position. The valve plug will not be shifted out of its "off" position until a definite increase in pressure in the impulse line has occurred.

The same action occurs if the pressure impulses are decreasing and the piston caused to move downwardly step-by-step. Each subsequent downward movement of the piston is occasioned by a definite decrease in pressure impulse with reference to the previous impulse. Thus it will be apparent that a positive pressure gradient is required in the operation of the pilot valve and stable operation of the regulator results.

Device 2 comprises an annular frame or support 17 having a rearwardly projecting flange 18 which is bolted to a pad 19 formed integral with the wall of cylinder 3, a ring 20, a cap 21 and a flexible diaphragm 22.

Ring 20 includes concentric circumferential flanges 23 and 24 of different diameters which are joined by a horizontal web 25. The web rests on circumferential shoulder 26 formed at the top of the inner surface of support 17. The outer edge of the diaphragm is disposed between web 25 and an annular shoulder 27 of the cap 21 so that when the cap is bolted to the support, a pressure tight joint is formed.

The central portion of the diaphragm is apertured as at 28 to accommodate a bolt 29 that extends through a thrust member 30. The bolt includes a washer 31 formed integral therewith which bears on the diaphragm all around its central aperture so that when a nut 32 is tightened, the diaphragm is clamped between the washer and thrust member to form a pressure tight joint. The bottom of cap 21 being thus closed and sealed by the diaphragm, in the manner above described, a pressure tight chamber 33 is formed to which the pressure control impulses are transmitted by impulse line 16.

The thrust member 30 includes an inverted cup portion 34 at the lower end of which is formed an outwardly projecting flange 35 that underlies the depending flange 24 of ring 20 so as to act as a stop to limit the upward movement of diaphragm 22. Downward movement of the diaphragm is limited by means of an inwardly projecting annular flange 36 formed at the lower end of the support member 17.

In order that an operative connection may be had between the diaphragm and valve plug 15, a link 38 is provided. This link has a ball-and-socket connection 39 with bolt 29 and a ball-and-socket connection 40 with the upper end of the valve plug. Thus, any misalignment between bolt 29 and valve plug 15 will be compensated for by these ball-and-socket connections.

Device 2 includes also a compression spring 41 one end of which is nested in the inverted cup portion of the thrust member 30. The opposite end of this spring is nested in a socket 42 that has screw thread engagement with a collar 43. Collar 43 is connected to a forked arm 44 by trunnions 45 so that the collar may pivot relative to the lever. Arm 44 is keyed to a shaft 46 which is journaled in bearings 47 and 48 formed integral with the support frame 17.

The inner end of shaft 46 carries an arm 49 which is keyed to the shaft and which, at its upper end, is provided with a roller 50 that rides on the angling bar 51. Thus as the piston moves, carrying the angling bar 51 with it, arm 49 is caused to swing either in the direction of arrow 52, if the piston is moving upwardly, or in the direction of arrow 53 if the piston is moving downwardly.

If the piston moves upwardly, forked arm 44 is turned in such a direction as to raise socket 42 and compress spring 41; or if the socket moves downwardly in response to downward movement of the piston, the tension in the spring is decreased.

When the valve plug is in "off" position, the pressure acting on diaphragm 22 is balanced by the force of the spring exerted on the diaphragm. Thus, if it be assumed that the valve plug is in its "off" position and an increase in the pressure impulse occurs, the diaphragm will move downwardly moving the valve plug downwardly to its "on" position raise, thereby compressing spring 41 because the spring socket 42 has not moved. As soon as the valve plug reaches its "on" position raise, compressed air is admitted to the lower end of cylinder 3 causing the piston to move upwardly. As the piston moves upwardly, arm 49 is caused to swing in the direction of arrow 52, spring socket 42 is moved upwardly and continues to move upwardly until the increased spring tension overcomes the pressure acting on the diaphragm and returns the valve plug to "off" position. When this occurs, the piston stops and does not move again in an upward direction until the pressure acting on the diaphragm increases a definite amount sufficient to move the valve plug to its "on" position raise. The piston then moves upwardly, arm 49 swings in the direction of arrow 52 as aforesaid, the spring socket is again raised, thereby compressing the spring until the force of the spring returns the valve plug to "off" position.

If the pressure impulses delivered to chamber 33 are gradually increasing, the piston will move upwardly step-by-step until it reaches the upper end of its stroke.

If it be assumed that valve plug 15 is in "off" position but that the pressure impulses acting on diaphragm 22 are decreasing, then the force exerted by the spring of the diaphragm will move the valve plug upwardly until it is in the "on" position lower. When in this position, air is admitted to the upper end of the cylinder and the piston caused to move downwardly. As the piston moves down, arm 49 and forked arm 44 swing in the direction of arrow 53, thereby lowering spring socket 42 and decreasing the force of the spring that is exerted in opposition to the impulse pressures acting on the diaphragm. As the spring tension is gradually lessened, the valve plug will be returned to "off" position when there is an equilibrium between the pressure acting on the diaphragm and the force of the spring acting in opposition thereto.

If the pressure impulses acting on the diaphragm tend to decrease definite successive decreases in pressure are required to effect successive downward movements of the piston.

In order to regulate or adjust the amount of travel that the piston may make in either direction before returning the valve plug to "off" position, as above described, the upper end of angling bar 51 is pivoted to a bracket 54 carried by side bar 7 and the lower end thereof is adjustably secured to a bracket 56 carried by the side bar.

Angling bar 51 is secured to bracket 56 by means of a bolt B which operates in a U shaped slot 55 in bracket 56, a nut N and washer W. When the nut is drawn up tight the bar is clamped to the bracket. An adjustment screw 51' is threaded through the lower end of bar 51 and bears against a stop 51a, and by turning this screw in one direction or the other and maintaining the end of the screw against the stop the angle between bars 51 and 7 may be changed. When the proper angle has been attained the nut N is drawn up tight to lock bar 51 in place. By changing the angle between the angling bar and side bar 7, the length of piston travel required to return the pilot valve from one or the other of its "on" positions, may be varied. To increase or lengthen such travel of the piston, the angle between the angling bar and side bar is decreased and to shorten the stroke this angle is increased.

Since the diaphragm is connected to the valve plug 15 by means of a link in which there is no lost motion, the valve plug and the diaphragm will move together in either direction. Also since the compression or gradient spring 41 is always under tension the roller on arm 39 will always be maintained in positive engagement with angling bar 51. Since the angling bar is rigidly connected to shaft 46 and the forked arm 44 is also rigidly connected to this shaft, there is no lost motion in the operative connections between the angling bar (and therefore the piston of the regulator), and the spring socket 42. For this reason, any change in pressure in the impulse chamber 33 will occasion immediate operation of valve plug 15 and immediate response by the piston working in cylinder 3.

From the above description it will be apparent also that if the pressure impulses communicated to pressure chamber 33 are not changing continuously but are either decreasing or increasing intermittently, that there will be a distinct step-by-step movement of the piston in cylinder 3.

However, assuming the pressure impulses in chamber 33 are steadily increasing, then it will be apparent that there will be a corresponding continuous upward movement of the piston in the cylinder because equilibrium between the pressure acting on the diaphragm 22 and the force exerted by the spring in opposition to such pressure will not be reached until such pressure impulses cease to increase in magnitude. A similar action takes place if the pressure impulses communicated to chamber 33 are steadily decreasing. In such case there will be a steady or continuous movement of the piston in a downward direction until equilibrium is reached between the force exerted by spring 41 and the pressure acting on the diaphragm.

With an arrangement such as described above the piston of the regulator will be caused to move substantially in direct proportion to the change in magnitude of the pressure impulses delivered to chamber 33 and acting on diaphragm 22. Movements of the piston are, therefore, accurately controlled both as to extent and rate of movement.

While but one form of the invention has been illustrated and described, it will be apparent to those skilled in this art that various modifications and changes may be made without departing either from the spirit or the scope of the invention. It is desired, therefore, that the appended claims be given such scope and range of equivalents as the invention merits under the law.

What I claim as new and desire to secure by Letters Patent is:

1. In combination a regulator comprising a cylinder having a piston working therein, a movable frame carried by the piston, and a pilot valve having raise and lower "on" positions and an "off" position for controlling the admission of motive fluid to the cylinder and the direction of travel of the piston, of a pressure sensitive diaphragm having a thrust member secured thereto and connected to the valve stem of the pilot valve, a crank arm carried by the cylinder, a socket carried by said arm, a compression spring having one end in said socket and the other end bearing against the diaphragm thrust member, an inclined bar carried by the regulator frame and a crank arm connected at one end to the spring socket crank arm and having a roller at the other end running on said inclined bar, said inclined bar acting to turn said crank arms in such direction as to shift the spring socket and adjust the spring tension by such amounts as to effect a return of the valve to "off" position each time the piston has moved the regulator frame a predetermined distance as the result of movement of the pilot valve to one of its "on" positions in response to a change in pressure impulses acting on the diaphragm.

2. In combination a regulator comprising a fixed cylinder having a piston working therein, a movable frame carried by the piston, and a pilot valve having raise and lower "on" positions and an "off" position for controlling the admission of motive fluid to the cylinder and the direction of travel of the piston, of a pressure sensitive diaphragm having a thrust member secured thereto and connected to the valve stem of the pilot valve, a crank arm carried by the cylinder, a socket carried by said arm, a compression spring having one end in said socket and the other end bearing against the diaphragm thrust member, an inclined bar carried by the regulator frame, means for adjusting the angle of inclination of said inclined bar, and a crank arm connected at one end to the spring socket crank arm and having a roller at the other end running on said inclined bar, said inclined bar acting to turn said crank arms in such direction as to shift the spring socket and adjust the spring tension by such amounts as to effect a return of the valve to "off" position each time the piston has moved the regulator frame a predetermined distance as the result of movement of the pilot valve to one of its "on" positions in response to a change in pressure impulses acting on the diaphragm.

3. In combination a regulator comprising a cylinder having a piston working therein, a movable frame carried by the piston, and a pilot valve having raise and lower "on" positions and an "off" position for controlling the admission of motive fluid to the cylinder and the direction of travel of the piston, of a pressure sensitive diaphragm connected to the valve stem of the pilot valve, a crank arm carried by the cylinder, a socket carried by said arm, a compression spring having one end in said socket and the other end bearing against the diaphragm, an inclined bar carried by the regulator frame and a crank arm connected at one end to the spring socket crank arm and having a roller at the other end running on said inclined bar, said inclined bar acting to turn said crank arms in such direction as to shift the spring socket and adjust the spring tension by such amounts as to effect a return of the valve to "off" position each time the piston has moved the regulator frame a predetermined distance as the result of movement of the pilot valve to one of its "on" positions in response to a change in pressure impulses acting on the diaphragm.

4. In combination a regulator comprising a fixed cylinder having a piston working therein, a movable frame carried by the piston, and a pilot valve having raise and lower "on" positions and an "off" position for controlling the admission of motive fluid to the cylinder and the direction of travel of the piston, of a pressure sensitive diaphragm connected to the valve stem of the pilot valve, a crank arm carried by the cylinder, a socket carried by said arm, a compression spring having one end in said socket and the other end bearing against the diaphragm, an inclined bar carried by the regulator frame, means for adjusting the angle of inclination of said inclined bar, and a crank arm connected at one end to the spring socket crank arm and having a roller at the other end running on said inclined bar, said inclined bar acting to turn said crank arms in such direction as to shift the spring socket and adjust the spring tension by such amounts as to effect a return of the valve to "off" position each time the piston has moved the regulator frame a predetermined distance as the result of movement of the pilot valve to one of its "on" positions in response to a change in pressure impulses acting on the diaphragm.

ROBERT R. DONALDSON, Jr.